United States Patent [19]

Stuhldreher

[11] Patent Number: 4,943,609
[45] Date of Patent: Jul. 24, 1990

[54] CURABLE RUBBER BLADDER STOCKS HAVING REDUCED VISCOSITY

[75] Inventor: Terrence M. Stuhldreher, Smyrna, Tenn.

[73] Assignee: The Uniroyal Goodrich Tire Company, Akron, Ohio

[21] Appl. No.: 338,679

[22] Filed: Apr. 17, 1989

[51] Int. Cl.$^5$ .............................. C08K 5/11; C08K 9/00
[52] U.S. Cl. ..................................... 524/314; 524/316; 524/317; 524/321; 524/574
[58] Field of Search ............... 524/314, 316, 574, 310, 524/321

[56] References Cited

U.S. PATENT DOCUMENTS 3,031,423 4/1962 Meier .................................. 524/314
4,022,848 5/1977 Lukich ................................ 525/138

OTHER PUBLICATIONS

"Heat Resistant Studies of Resin Cured Butyl (Tire Curing Bladders)," by Enjay Polymer Laboratories.

*Primary Examiner*—Joseph L. Schofer
*Assistant Examiner*—Mark D. Sweet
*Attorney, Agent, or Firm*—Daniel J. Hudak; Alan A. Csontos; Greg Strugalski

[57] ABSTRACT

A curable rubber bladder stock containing esters of ricinoleic acid or derivatives thereof has reduced viscosity as compared to stocks containing castor oil. The rubber stocks of the present invention generally retain a very high percentage of the initial cure tensile strength and have improved modulus as compared to castor oil, both upon initial cure and upon aging. Lower viscosity and higher modulus of the rubber stocks of the present invention readily permit the production of thinner bladders. The bladders can fit within an article such as a tire during vulcanization of the tire as in an automatic vulcanizing press. Thinner bladders effect a greater heat rate and result in shorter cure times for articles such as tires. The esters of ricinoleic acid and derivatives thereof have the formula

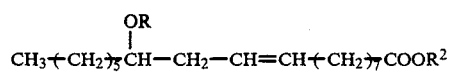

where R is H or

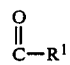

where $R^1$ is an aliphatic, preferably an alkyl, having from 1 to 12 carbon atoms, desirably from 1 to 4 carbon atoms, and preferably 1 carbon atom, i.e., methyl, and $R^2$ is an aliphatic, desirably an alkyl, having from 1 to 12 carbon atoms and preferably from 1 to 4 carbon atoms.

7 Claims, No Drawings

CURABLE RUBBER BLADDER STOCKS HAVING REDUCED VISCOSITY

FIELD OF THE INVENTION

The present invention relates to curable rubber bladder stocks containing esters of ricinoleic acid or derivatives thereof. The stocks can be utilized in the preparation of curing bladders.

BACKGROUND

Heretofore, curing bladders have been employed in automatic vulcanizing presses such as the McNeil "Bag-O-Matic" presses and actually fit within a tire during the vulcanizing operation and is readily removed from the cured tire at the end of each curing cycle. As in most manufacturing operations, there exists a need to improve the rate of cure of the tire and hence result in an overall reduced cure time cycle thereby allowing greater utilization of the automatic vulcanizing tire press.

An article "Heat Resistant Studies of Resin Cured Butyl (Tire Curing Bladders)," by Enjay Polymer Laboratories, relates to a technical service report in which various additives have been added to a butyl rubber including on page 7, a plasticizer study wherein castor oil, oleic acid, and butyl oleate were added.

SUMMARY OF THE INVENTION

It is an aspect of the present invention to provide curable rubber bladder stocks having reduced viscosity and improved moldability of thin gauge bladders since they contain esters of ricinoleic acid or derivatives thereof.

It is another aspect of the present invention to provide cured rubber bladder stocks which have improved physical properties such as cure modulus, aged cured modulus, and retention of tensile strength after heat aging.

It is still another aspect of the present invention to provide cured rubber bladder stocks in the form of rubber bladders having reduced thickness to provide better heat transfer therethrough which allows for increased productivity of a vulcanizable article such as tires.

These and other aspects will become apparent from the following detailed description.

In general, a curable rubber bladder stock composition, comprises: a curable bladder rubber, and an effective amount of a derivative of ricinoleic acid capable of reducing the viscosity of said rubber bladder stock, said derivative of said ricinoleic acid having the formula

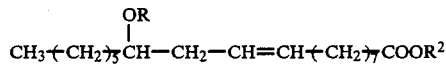

wherein R is H or

where $R^1$ is an aliphatic having from 1 to 12 carbon atoms, and wherein $R^2$ is an aliphatic having from 1 to 12 carbon atoms.

DETAILED DESCRIPTION OF THE INVENTION

The curable rubber bladder stock of the present invention contains many conventional ingredients, as known to those skilled in the art as well as to the literature. For example, the bladder rubber is preferably butyl rubber although other rubbers including those known to the literature such as chlorobutyl, ethylene-propylene rubbers, as well as ethylene-propylene-diene (EPDM) rubbers can be utilized. Generally, a small amount of a chlorinated rubber such as neoprene is utilized in an amount as from about 3 to about 15 parts, desirably from about 5 to about 10 parts, and preferably from about 7 to about 8 parts by weight per 100 parts by weight of said butyl or bladder rubber. Another common component of the rubber bladder stock is a reinforcing filler such as carbon black, e.g., reinforcing black (Grade N399 or below), HAF, and the like, in an amount as from about 20 to about 70 parts and desirably from about 40 to about 50 parts per every 100 parts by weight of the bladder rubber. Various activators are also utilized such as stearic acid, and the like in small amounts as from 0.5 to about 5 parts and desirably from about 1 to about 3 parts by weight per 100 parts by weight of said bladder rubber. The curable rubber bladder stock also contains various oil components such as aromatic oils or paraffinic oils in sufficient amounts as from about 0.1 to about 15 parts by weight and preferably from about 5 to about 10 parts by weight per every 100 parts by weight of the bladder rubber to improve processability. Another component of the curable rubber bladder stock which is often utilized is a cure activator such as zinc oxide in an amount of from about 1 to about 10 parts and preferably from about 4 to about 6 parts by weight per every 100 parts by weight of said bladder rubber. Generally, any conventional curing agents can be utilized to cure the bladder rubber with a specific type being the various phenolic resins as in an amount of from about 2 to about 20 parts by weight and preferably from about 5 to about 10 parts by weight per every 100 parts by weight of said bladder rubber. Castor oil is optionally utilized as a mold release agent as in an amount of from about 0.1 to about 10 parts by weight per 100 parts by weight of said bladder rubber.

According to the present invention, it has been surprisingly found that the use of various esters of ricinoleic acid and derivatives thereof reduces the viscosity to the curable rubber bladder stock and that, upon cure of the same as in the form of a curing bladder as used in tire vulcanizing presses, the cured rubber bladder stock (e.g., a curing bladder) has improved physical properties. The esters of ricinoleic acid and derivatives thereof which are utilized have the formula

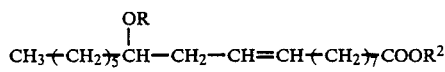

wherein R is H or

where $R^1$ is an aliphatic, preferably an alkyl, having from 1 to 12 carbon atoms, desirably from 1 to 4 carbon atoms, and preferably 1 carbon atom, that is methyl. $R^2$ is an aliphatic, desirably an alkyl, having from 1 to 12 carbon atoms and preferably from 1 to 4 carbon atoms. The amount of the ester derivative of ricinoleic acid is from about 1 to about 12 parts by weight, desirably from about 4 to about 8 parts by weight, and preferably from about 5 to about 7 parts by weight, per 100 parts by weight of said bladder rubber, e.g., butyl rubber.

The uncured rubber bladder stock, the esters of ricinoleic acid or derivatives thereof, as well as the various additives such as reinforcing fillers, oils, etc., are added to a conventional rubber mixer such as a Banbury, and mixed for a suitable amount of time at elevated temperatures which are usually generated by the mixing of the components. A desired mixing sequence is to add the butyl or any neoprene rubber, etc. and mix for approximately a minute or two and then subsequently add any carbon black, any processing oil, any castor oil, the ricinoleic acid ester or derivatives thereof, and the like. The various components are mixed until blended and then dumped at a temperature which is approximately 180° C. which was generated by the mixing. Upon cooling, the mixture is added to a Banbury along with any zinc oxide and curing agents such as a phenolic resin and mixed and subsequently dumped at a temperature of approximately 110° C.

The curable rubber bladder stock of the present invention is generally formed into any suitable article wherein good physical properties are desired, especially upon aging, such as modulus and tensile strength. A particularly suitable end use is as a curing bladder utilized in a conventional tire vulcanizing press, that is, as a curing bladder which fits within the interior portion of a tire during the vulcanization operation of the tire wherein the bladder is inflated with a hot fluid such as steam or water to maintain the position of the tire within the vulcanizing press. Upon completion of vulcanization of the tire, the bladder can be deflated or otherwise removed from the tire press and another tire carcass inserted into the press with the bladder reinserted and reinflated. Due to the improved moldability of the rubber bladder stock of the present invention since it has an unexpectedly low viscosity, it can be readily molded to produce thin curing bladders. Furthermore, since the cured bladder stock has an unexpectedly high modulus and good tensile strength retention, thinner bladders can be produced. Reduced thickness results in improved or increased heat transfer. Increased or more efficient heat transfer generally results in quicker cure of a tire in an automatic vulcanizing press and hence increased cure production output which is naturally highly desirable.

The invention will be better understood by reference to the following examples.

EXAMPLE 1

| General Formulation Ingredient | Amount by Weight |
|---|---|
| Butyl Rubber | 100 |
| Neoprene | 5 |
| Carbon Black (N299) | 45 |
| Zinc Oxide | 5 |
| Castor Oil | * |
| Ester of Ricinoleic Acid or derivative thereof | * |
| Curing Resin (phenolic) | 9 |
| Stearic Acid | 1 |

*Varied as set forth in Table I.

The above formulation was compounded in the following manner. The curable bladder rubber was added to a BR Banbury mixing vessel at 120° F., after approximately ½ minute, at approximately 130° F., one-half of the total amount of carbon black was added. The balance of the carbon black was added approximately ½ minute later at approximately 160° F. and mixed approximately 3 minutes. Subsequently, at approximately 250° F., the oils, including the castor oil, ricinoleic acid esters and stearic acid were added and mixed for approximately 2 minutes, approximately 245° F., and then dumped. The dumped material was added to a BR Banbury mixing vessel at approximately 125° F. along with the zinc oxide and the curing resin and mixed for approximately 2 minutes and dumped at approximately 210° F.

The above composition was cured and aged for various times as set forth below and various physical properties are set forth in Table I.

TABLE I

|  | Control | Control | A* | B* | C* | Control | D* | E* |
|---|---|---|---|---|---|---|---|---|
| Stress-Strain 45' @ 340° F. | | | | | | | | |
| Tensile | 1908 | 1866 | 1930 | 1809 | 1841 | 1887 | 1912 | 1825 |
| 100% Modulus | 170 | 190 | 190 | 198 | 221 | 180 | 190 | 210 |
| 300% Modulus | 563 | 587 | 633 | 733 | 718 | 575 | 623 | 726 |
| Elongation | 734% | 716% | 683% | 618% | 619% | 725% | 687% | 619% |
| Stress-Strain 150' @ 340° F. | | | | | | | | |
| Tensile | 1768 | 1868 | 2015 | 1810 | 1903 | 1818 | 1989 | 1857 |
| 100% Modulus | 225 | 205 | 232 | 270 | 228 | 215 | 226 | 249 |
| 300% Modulus | 737 | 718 | 852 | 972 | 890 | 728 | 848 | 931 |
| Elongation | 606% | 643% | 593% | 519% | 555% | 625% | 595% | 537 |
| Mooney Scorch LR @ 320° F. | | | | | | | | |
| MV | 45 | 45 | 42 | 42 | 43 | 45 | 41.5 | 42.5 |
| Stress-Strain 45' @ 340° F. (Aged 7 days in N$_2$ @ 350° F.) | | | | | | | | |
| Tensile | 1820 | 1825 | 1930 | 1800 | 1750 | 1823 | 1880 | 1775 |
| 100% Modulus | 300 | 300 | 310 | 295 | 360 | 300 | 305 | 327 |
| 300% Modulus | 910 | 900 | 1020 | 1025 | 1080 | 905 | 1005 | 1052 |
| Elongation | 590% | 610% | 550% | 500% | 495% | 600% | 537% | 497% |
| Stress-Strain 150' @ 340° F. | | | | | | | | |
| Tensile | 1800 | 1780 | 1900 | 1700 | 1700 | 1790 | 1890 | 1700 |
| 100% Modulus | 290 | 250 | 290 | 320 | 350 | 270 | 300 | 335 |
| 300% Modulus | 860 | 825 | 1010 | 1010 | 1000 | 842 | 1027 | 1005 |

TABLE I-continued

|  | Control | Control | A* | B* | C* | Control | D* | E* |
|---|---|---|---|---|---|---|---|---|
| Elongation | 580% | 575% | 550% | 490% | 480% | 577% | 540% | 485% |

A* contained 6 phr of methyl ricinoleate
B* contained 6 phr of methyl acetyl ricinoleate
C* contained 6 phr of methyl acetyl ricinoleate
D* contained 6 phr of methyl ricinoleate
E* contained 6 phr of methyl acetyl ricinoleate
Control - Each control contained 6 phr of castor oil As apparent from the above data, initial tensile strength was generally higher utilizing the esters of ricinoleic acid or derivatives thereof of the present invention as compared to castor oil. Moreover, 100 percent as well as 300 percent modulus were also higher than castor oil. The Mooney scorch indicates that the viscosity of the compounds of the present invention was unexpectedly lower than castor oil. The aging data, after seven days in nitrogen, reveals that good retention of tensile strength was maintained and that the modulus was higher in comparison to castor oil. Hence, applicants have generally achieved improved physical results as with regard to tensile strength and modulus and yet unexpectedly has achieved reduced viscosity, an important factor in permitting improved processing as well as the production of thinner curing bladders.

In comparison, Table II reveals that when oleic acid or a butyl ester thereof was utilized, a relative decrease in tensile strength as well as 300 percent modulus was obtained as reported by the Enjay article set forth in the Background of the Invention.

TABLE II

|  | 1 | 2 | 3 |
|---|---|---|---|
| Castor Oil | 5 | — | — |
| Oleic Acid | — | 5 | — |
| Butyl Oleate | — | — | 5 |
| *Original Physical Properties Cured 30 min. at 330° F.* | | | |
| Hardness, Shore A | 54 | 56 | 52 |
| 300% Modulus, psi | 200 | 600 | 360 |
| Tensile Strength, psi | 1110 | 2030 | 1580 |
| Elongation, % | 1000 | 800 | 850 |
| *Aged in Air Oven 48 hrs. at 350° F. Cured 60 min. at 330° F.* | | | |
| Hardness, Shore A | 76 | 70 | 65 |
| 300% Modulus, psi | 460 | 400 | 250 |
| Tensile Strength, psi | 625 | 500 | 300 |
| Elongation, % | 410 | 410 | 390 |

While in accordance with the Patent Statutes, the best mode and preferred embodiment has been set forth, the scope of the invention is not limited thereto, but rather by the scope of the attached claims.

What is claimed is:

1. A cured tire curing bladder, comprising:
the cured tire bladder made from a curable bladder rubber and an effective amount of a derivative of ricinoleic acid, said derivative of ricinoleic acid having the formula

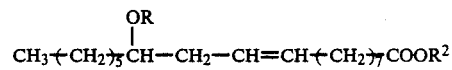

wherein R is

where $R^1$ is an aliphatic having from 1 to 12 carbon atoms, and wherein $R^2$ is an aliphatic having from 1 to 12 carbon atoms.

2. A cured tire curing bladder according to claim 1, wherein said effective amount of said derivative of ricinoleic acid is from about 1 to about 12 parts by weight per 100 parts by weight of said curable bladder rubber.

3. A cured tire curing bladder according to claim 2, wherein $R^1$ is an aliphatic having from 1 to 4 carbon atoms, and $R^2$ is an aliphatic having from 1 to 4 carbon atoms.

4. A cured tire curing bladder according to claim 2, wherein $R^1$ is an alkyl having from 1 to 4 carbon atoms, and wherein $R^2$, is an alkyl having from 1 to 4 carbon atoms.

5. A cured tire curing bladder according to claim 4, wherein the amount of said derivative of ricinoleic acid is from about 4 parts to about 8 parts by weight per 100 parts by weight of said curable bladder rubber.

6. A cured tire curing bladder according to claim 5, wherein R is

wherein $R^2$ is methyl, and wherein said curable bladder rubber is butyl rubber.

7. A cured tire curing bladder according to claim 6, wherein the amount of said derivative of ricinoleic acid is from about 5 parts to about 7 parts by weight per 100 parts by weight of said butyl rubber.

* * * * *